United States Patent
Saulnier et al.

(10) Patent No.: US 11,294,019 B2
(45) Date of Patent: Apr. 5, 2022

(54) GEOLOCATION CALIBRATION FOR CALIBRATING RADIO DIRECTION FINDING SYSTEM BY REMOTE CONTROL

(71) Applicant: Southwest Research Institute, San Antonio, TX (US)

(72) Inventors: Steven P. Saulnier, San Antonio, TX (US); Benjamin S. Davis, Mico, TX (US); Patrick D. Hanrahan, San Diego, CA (US); Mike J. Herring, San Diego, CA (US)

(73) Assignee: Southwest Research Institute, San Antonio, TX (US)

( * ) Notice: Subject to any disclaimer, the term of this patent is extended or adjusted under 35 U.S.C. 154(b) by 394 days.

(21) Appl. No.: 15/854,841

(22) Filed: Dec. 27, 2017

(65) Prior Publication Data
US 2019/0195978 A1    Jun. 27, 2019

(51) Int. Cl.
*G01S 1/02* (2010.01)
*G01S 19/13* (2010.01)
*G01S 3/02* (2006.01)
*G01S 19/14* (2010.01)

(52) U.S. Cl.
CPC .............. *G01S 1/026* (2013.01); *G01S 3/023* (2013.01); *G01S 19/13* (2013.01); *G01S 19/14* (2013.01)

(58) Field of Classification Search
CPC .......... G01S 1/026; G01S 3/023; G01S 19/13; G01S 19/14
USPC ......................................................... 342/420
See application file for complete search history.

(56) References Cited

U.S. PATENT DOCUMENTS

| | | | | |
|---|---|---|---|---|
| 4,513,378 A * | 4/1985 | Antkowiak | ............ | G01C 21/12 701/494 |
| 6,101,390 A * | 8/2000 | Jayaraman | ............. | G01C 21/26 455/456.1 |
| 6,104,344 A * | 8/2000 | Wax | ........................ | G01S 1/026 342/378 |
| 6,421,010 B1 * | 7/2002 | Chadwick | ................. | G01S 3/48 342/462 |
| 6,791,472 B1 * | 9/2004 | Hoffberg | ............ | H04B 7/18576 340/539.17 |
| 7,268,700 B1 * | 9/2007 | Hoffberg | ................... | G08G 1/20 340/905 |
| 7,271,737 B1 * | 9/2007 | Hoffberg | .............. | G08G 1/0104 340/539.17 |
| 2002/0126046 A1 * | 9/2002 | Counselman, III | ....... | G01S 5/10 342/464 |

(Continued)

FOREIGN PATENT DOCUMENTS

EP          2567192 B1 *  4/2018  ............. G01C 17/38

*Primary Examiner* — Bernarr E Gregory
*Assistant Examiner* — Nuzhat Pervin
(74) *Attorney, Agent, or Firm* — Livingston Law Firm

(57) ABSTRACT

A mobile radio direction finding (RDF) calibrator, and a method of using it to calibrate an RDF system aboard a vehicle. The calibrator has a GPS (global positioning satellite) or other GNSS (global navigation satellite system) receiver, which permits the calibrator to make its location known to the calibration process of the RDF-equipped vehicle. During calibration, the calibration process controls the calibrator remotely. As the RDF-equipped vehicle moves in a circle, it collects calibration response data, as well as location data, so that the calibration response data can be mapped to the correct azimuth.

14 Claims, 4 Drawing Sheets

(56) References Cited

U.S. PATENT DOCUMENTS

| | | | |
|---|---|---|---|
| 2003/0117318 A1* | 6/2003 | Champlain | G01S 13/785 342/387 |
| 2006/0238413 A1* | 10/2006 | Yehudaie | G01S 3/023 342/174 |
| 2011/0050497 A1* | 3/2011 | Maenpa | G01S 19/23 342/368 |
| 2012/0086606 A1* | 4/2012 | Mathews | G01C 21/165 342/461 |
| 2015/0015436 A1* | 1/2015 | Broquet | G01S 3/46 342/357.38 |
| 2015/0043012 A1* | 2/2015 | Rudow | G01S 7/4813 356/614 |
| 2015/0045058 A1* | 2/2015 | Rudow | H04M 1/72457 455/456.1 |
| 2015/0045059 A1* | 2/2015 | Rudow | H04W 4/021 455/456.1 |
| 2015/0050907 A1* | 2/2015 | Rudow | G01S 19/35 455/404.2 |
| 2015/0057028 A1* | 2/2015 | Rudow | G01C 21/20 455/456.3 |
| 2016/0035096 A1* | 2/2016 | Rudow | H04N 5/44 348/135 |
| 2016/0040992 A1* | 2/2016 | Palella | G01C 5/06 702/152 |
| 2016/0131751 A1* | 5/2016 | Mathews | G01S 11/10 342/461 |
| 2016/0259061 A1* | 9/2016 | Carter | G01S 19/05 |
| 2017/0132931 A1* | 5/2017 | Hoffberg | G08G 1/166 |
| 2017/0242442 A1* | 8/2017 | Minster | G06T 7/32 |
| 2018/0014151 A1* | 1/2018 | Kratz | H04W 4/029 |
| 2018/0024247 A1* | 1/2018 | Carter | H04W 4/029 342/357.26 |
| 2019/0182415 A1* | 6/2019 | Sivan | G06F 1/163 |

* cited by examiner

GEOLOCATION CALIBRATION FOR CALIBRATING RADIO DIRECTION FINDING SYSTEM BY REMOTE CONTROL

GOVERNMENT SUPPORT CLAUSE

This invention was made with United States Government Support under Contract No. N6878612D7258TO0111 funded by the United States Navy. The Government has certain rights in this invention.

TECHNICAL FIELD OF THE INVENTION

This invention relates to radio direction finding systems, and more particularly to calibrating radio direction finding systems.

BACKGROUND OF THE INVENTION

A radio direction finder (RDF) is a device for finding the direction, or bearing, to a radio source. The act of measuring the direction is known as radio direction finding (RDF). Using two or more measurements of different receiver locations, the location of an unknown transmitter can be determined.

An RDF system may be a ground-based, airborne, or seaborne system that locates or monitors various radio signal sources, stationary or movable, by determining a line of bearing (LOB) to the source. RDF systems have many applications, which may require the ability to determine bearings to radio signal sources over a broad range of broadband frequencies. For instance, wideband RDF systems may scan a frequency range of a few MHz to several thousand MHz.

RDF systems have receiving antennas that receive radio signals, as well as radio and processing equipment that calculate a LOB. This determination uses amplitude and/or phase comparisons of the radio signals. Because the antennas' patterns are affected by the platform on which they are mounted, a calibration process is required to account for un-calculable effects.

For determining a LOB to an unknown signal of interest (SOI), the RDF system relies on a "calibration manifold database", which is created during a calibration process. When determining a LOB, the RDF system tunes its radio receiver equipment to intercept an SOI. The intercepted SOI amplitude and phase response of each RDF antenna is measured and compared to the nearest lower and higher frequencies in the calibration manifold database. After comparing the intercepted signal data to data stored in the calibration database, the LOB is produced. This LOB is the bearing that is the best fit to the antenna responses stored in the calibration database. Better accuracy (lower error) is produced with more frequencies in the calibration database.

When RDF systems are in use in foreign territories, they can be prevented from being calibrated because of frequency propagation restrictions. Because various different segments of the radio spectrum are not controlled by any single entity, it has become impossible to secure permission to transmit land-based calibration signals at enough frequencies to insure adequate RDF performance.

An additional calibration problem exists for nautical RDF systems. The conventional method for shipboard RDF calibration requires ships to travel to land-based Shipboard Electronic Systems Evaluation Facility (SESEF) antenna test ranges. The SESEF test locations are far and few in between, and ships often go uncalibrated if they cannot leave their respective mission areas. These calibration tests are costly in terms of time and money.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Overview

The following description is directed to a geolocation RDF calibrator and a method of using it to calibrate an RDF system aboard a ship or other vehicle. The calibrator transmits calibration signals to the RDF system's calibration process. The calibrator is mobile, hence, its "geolocation" attribute, i.e., it must transmit its location as well as the calibration signals. The calibrator is also unmanned, which requires that it be controlled remotely.

For purposes of example, the calibrator is described in terms of having a buoy deployed at sea to carry calibration equipment. The calibrator is used to calibrate an RDF system on board a ship. The calibrator delivers calibration signals to the ship, and is in data communication with the ship.

In other embodiments, the RDF system being calibrated could be on some vehicle other than a ship. In general, the calibrator is suitable for calibrating an RDF system carried by any type of manned or unmanned aerial, ground, or water vehicle.

It follows that, as alternatives to being carried on a buoy, the calibrator's hardware could be carried on various platforms other than a buoy. Examples are other types of watercraft, aircraft, or ground platforms. The platform may itself be a vehicle. A common characteristic of these platforms is that they need not be stationary. They are "mobile" in the sense that they may move or be moved. A further feature of the platform is that it may be deployed and retrieved anywhere, and by the same vehicle whose RDF system is to be calibrated.

Another feature of the calibrator is that it allows transmissions in international waters at enough frequencies to adequately characterize shipboard RDF systems so that they can produce acceptable LOB results to support operational mission requirements. It avoids the problem of frequency band restrictions imposed various different political, geographic and operator entities.

Calibrator Platform and Equipment

Figure 1:
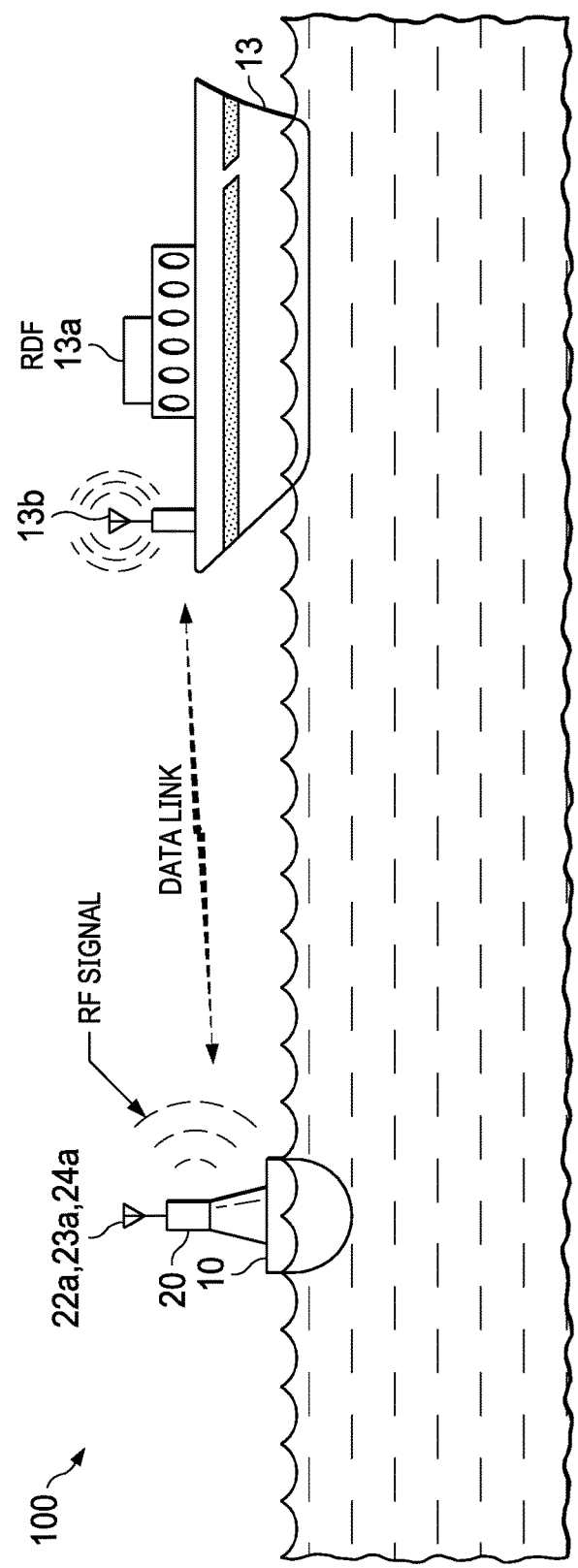
FIG. 1 illustrates one embodiment of the geolocation calibrator, deployed as a buoy used for calibrating a ship at sea.

FIG. 1 illustrates an example of an application of calibrator 100. As stated above, in the example of this description, calibrator 100 has a buoy 10 to carry the calibration equipment (hardware unit 20 and antennas 22a, 23a, and 24a). It is assumed that this equipment is sufficiently robust to withstand environmental conditions.

Buoy 10 is free-floating at sea, typically operating in a location without frequency propagation regulations. In other embodiments, buoy 10 may be any floating platform suitable to carry the calibration equipment, and located in any body of water. As stated above, in other applications, at sea or on land or in air, buoy 10 may be replaced by other types of mobile platforms.

In this example, the calibration is for the benefit of a ship 13, which carries a RDF system 13a and associated antennas 13b. In other embodiments at sea, ship 13 may be any type of watercraft, and as explained above, the calibrator is useful for vehicles other than ships.

It is assumed that the RDF system 13a aboard ship 13 has appropriate hardware and software for conducting a calibration process as described herein. As explained below, calibrator 100 transmits RF signals, as well as its own location data, to the ship's calibration process. The ship typically has a human operator for directing the calibration process, but the division of tasks between a human operator and an automated calibration process is a design choice.

It is further assumed that the ship has appropriate equipment for data communications with calibrator 100. The calibration process is directed by personnel aboard ship 13, via a data communications link. This is the "remote" aspect of the invention; because there is no operator at calibrator 100, the calibration process must be initiated and controlled remotely from ship 13.

Figure 2:
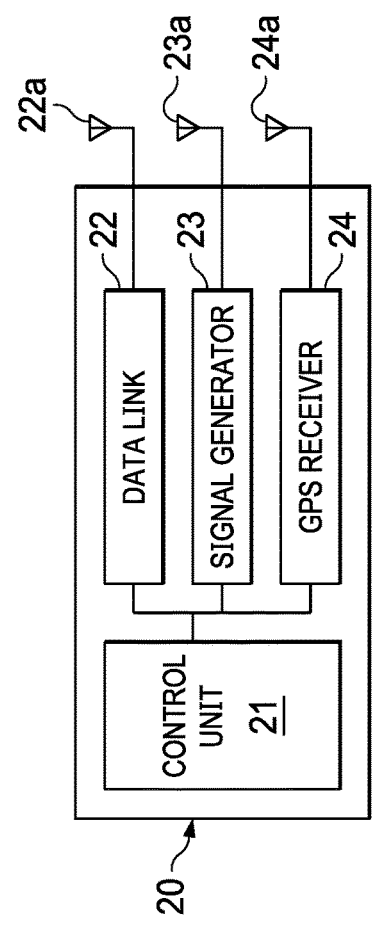
FIG. 2 illustrates the calibration hardware of the geolocation calibrator.

FIG. 2 illustrates calibration hardware 20 in further detail. It is assumed that calibration hardware 20 has appropriate power, and because of its mobile character, is designed for battery powered operation.

Control unit 21 is processor-based, with appropriate hardware and software for carrying out tasks described herein. Control unit 21 may be any small multi-purpose computer. Box computers particularly designed for embedded industrial applications and suited for demanding environments are commercially available.

Control unit 21 is in data communication with a data link 22, signal generator 23, and GPS receiver 24. Each of these elements has an appropriate antenna, e.g., data link antenna 22a, radio antenna 23a, and GPS antenna 24a respectively.

Figure 3:
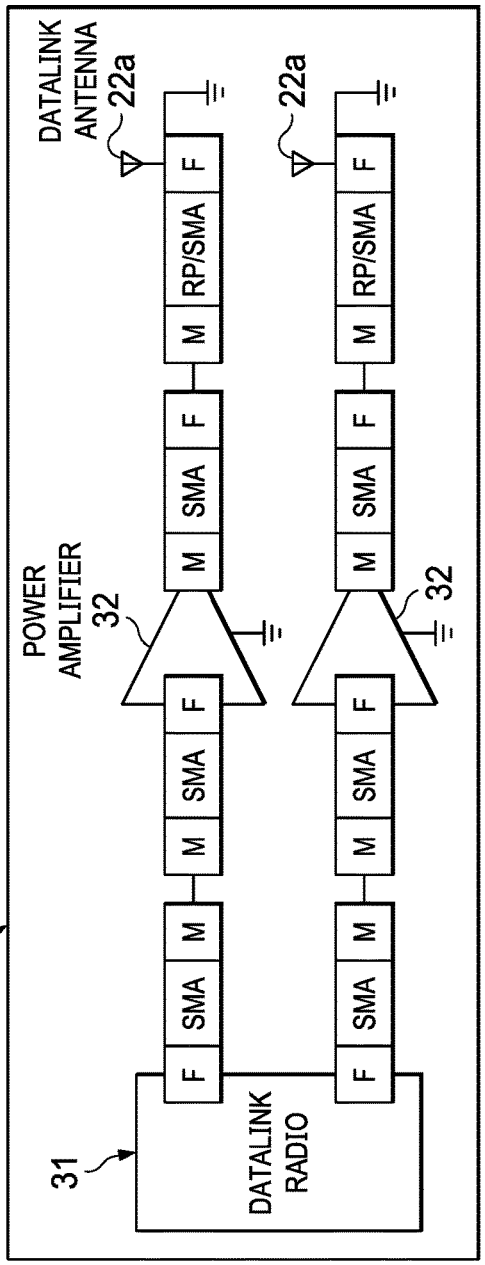
FIG. 3 illustrates the datalink of FIG. 2 in further detail.

FIG. 3 illustrates datalink 22 in further detail. A bi-directional datalink radio 31 is in digital communication with ship 13. As shown, coaxial RF connections are made to a power amplifier 32 and to datalink antenna 22a.

Datalink antenna 22a may be any one of commercially available antennas, intended for datalink communications. In the example of FIG. 3, datalink 22 uses two antennas 22a, for spatial diversity and resistance to signal fading.

As further explained below, in during a calibration process, datalink 22 receives commands from ship 13 to initiate, control, and configure the calibration process. Datalink 22 also transmits location data, representing the current location of the calibrator 100.

Figure 4:
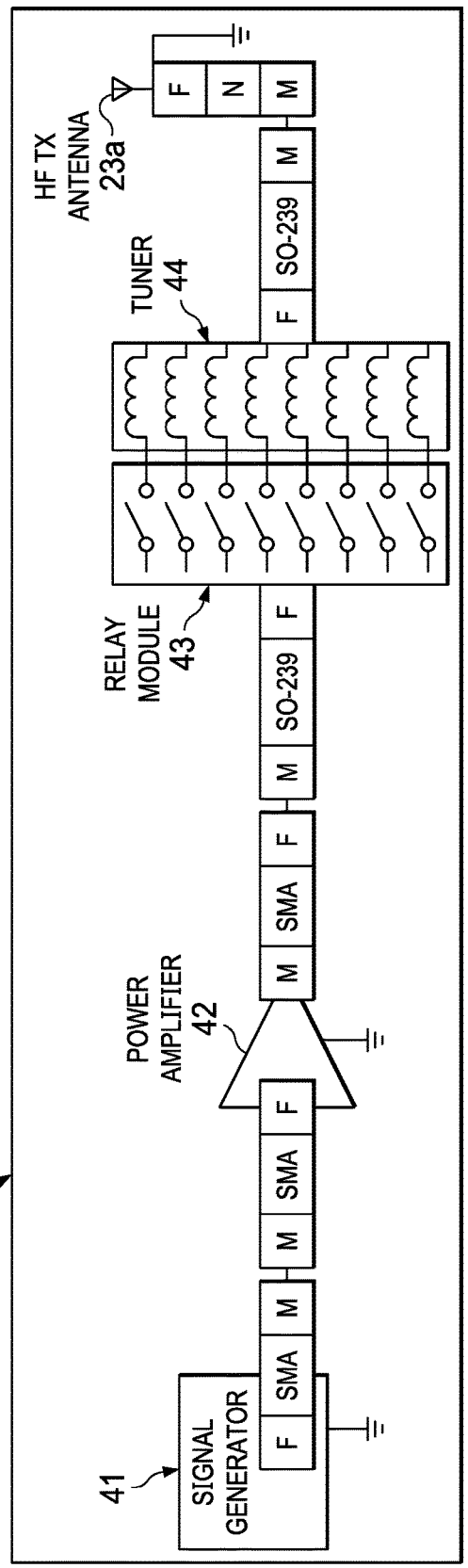
FIG. 4 illustrates the signal generator of FIG. 2 in further detail.

FIG. 4 illustrates signal generator 23 in further detail. Signal generator 41 is a full band signal generator for continuous wave (CW) tones to calibrate HF, VHF, and UHF RDF systems. Signal generator 41 is coaxially connected to a power amplifier 42. The amplified signal is then delivered to relay module 43 and antenna tuner 44.

As explained below, during calibration, signal generator 23 is remotely controlled by ship 13. The calibration signals are transmitted to ship 13, via a high frequency transmit antenna 23a. Antenna 23a is a vertically polarized omnidirectional monopole antenna. An example of a suitable antenna 23a is a Shakespeare SKP-16V2 antenna, in common use for military applications.

Figure 5:
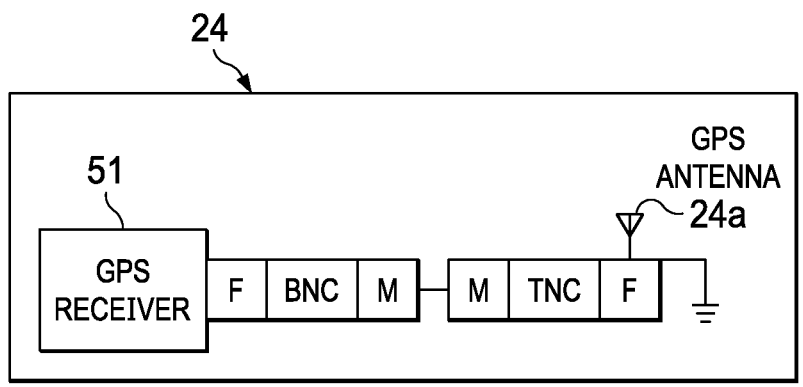
FIG. 5 illustrates the GPS receiver of FIG. 2 in further detail.

FIG. 5 illustrates GPS (global positioning satellite) receiver 24 in further detail. A GPS antenna 24a receives GPS satellite signals. Receiver 51 determines GPS location data of calibration station 10. GPS timestamp data is used to synchronize calibration signal transmissions. As alternatives to GPS, various other types of (GNSS) global navigation satellite systems could be used.

Referring again to FIG. 2, during a calibration process, control unit 21 reads GPS location and timestamp data from GPS receiver 24, and provides location data to ship 13 via datalink 22. It controls signal generator 23, using control data received from ship 13 via datalink 22. This control data comprises control of the signal generator's tuner, start and stop transmissions, and frequency lists as required by the calibration process aboard ship 13.

Calibration Method

Figure 6:
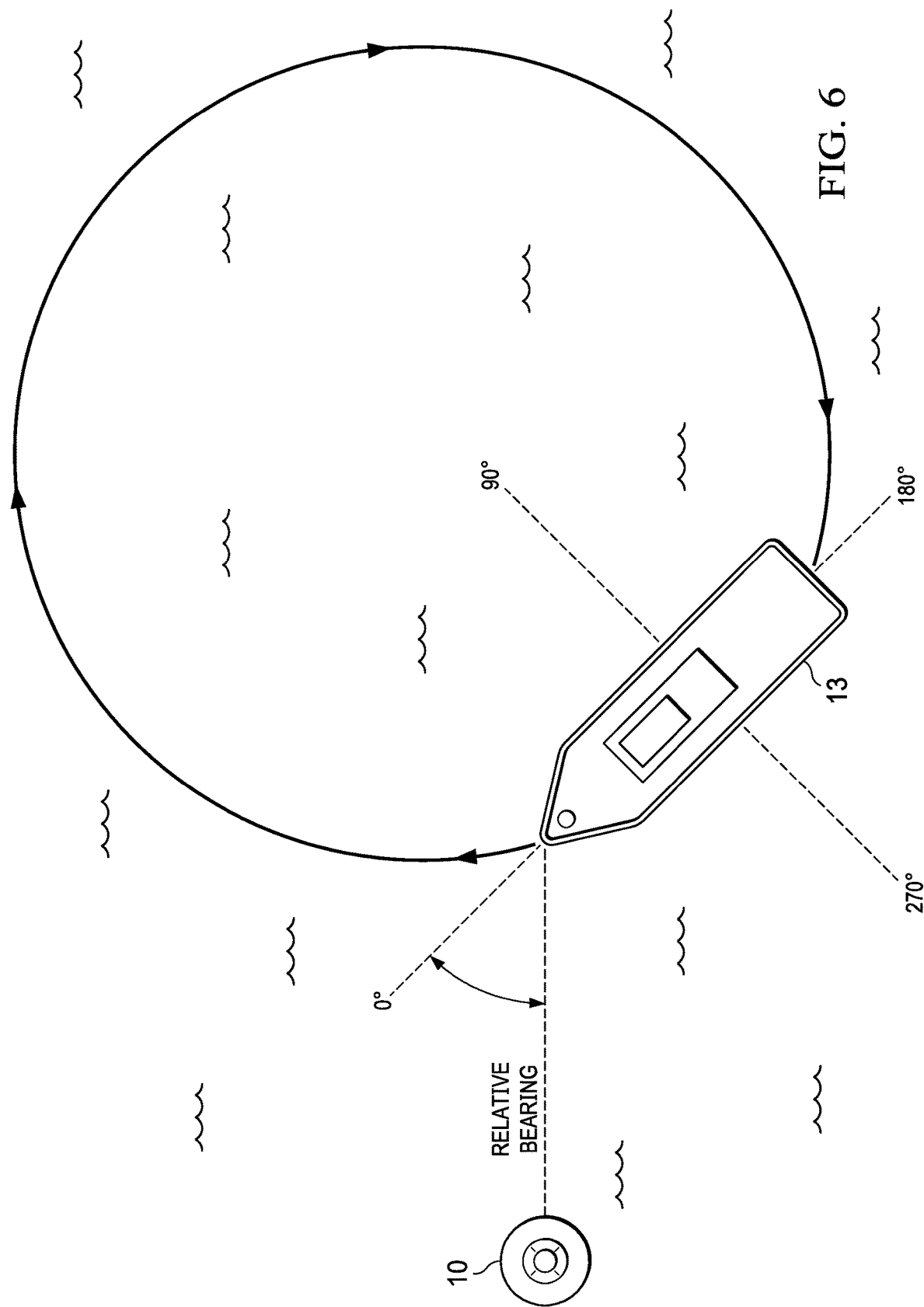
FIG. 6 illustrates the geolocation calibrator and an RDF-equipped ship during the calibration process.

FIG. 6 illustrates calibrator 100 and ship 13, illustrating a Relative Bearing, which is a line of bearing that is relative to the bow of ship 13. Zero degrees relative is directly in front of the bow, 90 degrees relative is directly Starboard (right), 180 degrees relative is directly aft, and 270 degrees relative is Port (left).

During RDF calibration, the ship 13 turns in a complete circle, some distance from calibrator 100. As it turns, ship 13 collects calibration response data at incremental azimuth positions relative to calibrator 100.

Because calibrator 100 is floating, it must transmit its location to the ship's calibration process so that the ship can calculate the actual relative azimuth of the calibrator 100 relative to the ship's bow. The ship's calibration process may then determine the correct azimuth to assign to the calibration response data.

Figure 7:
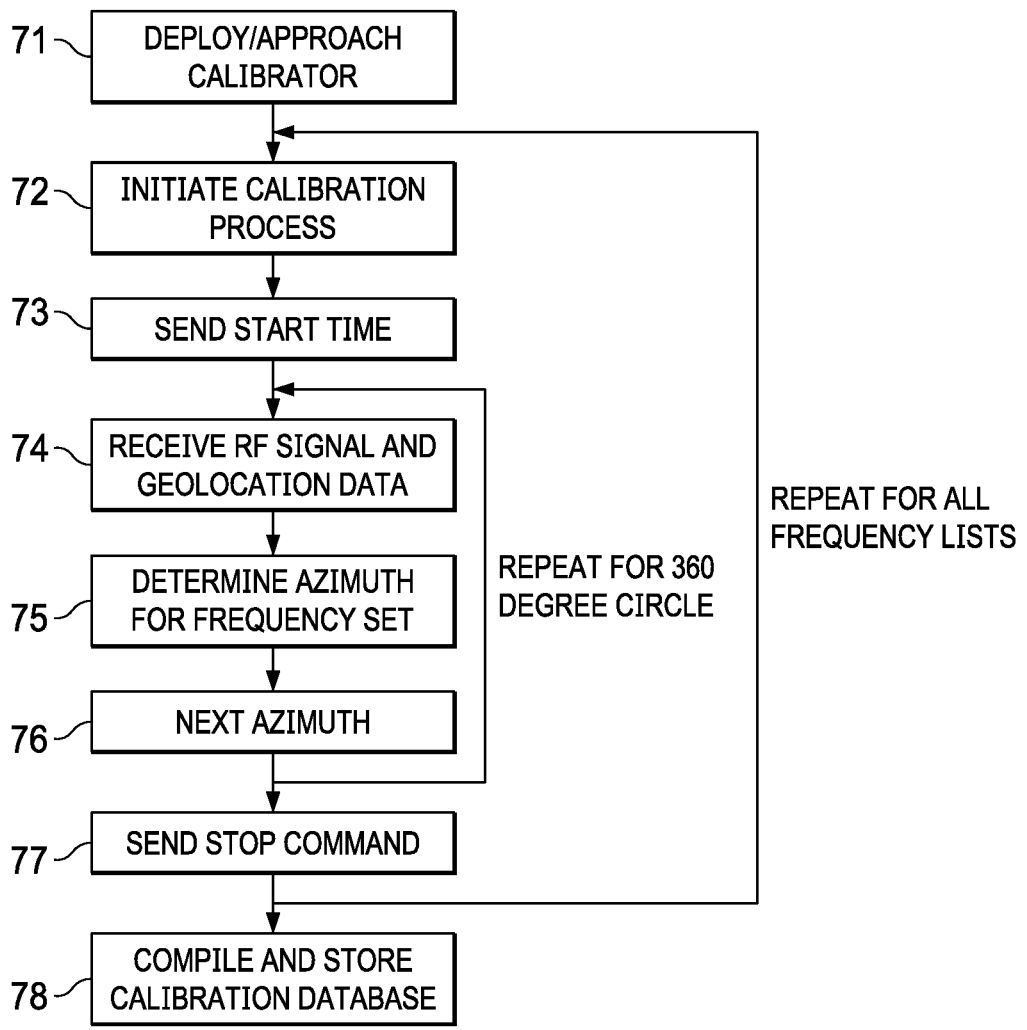
FIG. 7 illustrates a method of calibrating an RDF-equipped vehicle, using the geolocation calibrator.

FIG. 7 illustrates a method of using calibrator 100 to calibrate a RDF system aboard a vehicle, here described as ship 13. As explained below, the location of the calibrator 100 must be made known to the ship's calibration process. Also, calibrator 100 must be remotely controlled because it has no operator of its own.

Step 71 is approaching the vicinity of calibrator 100. As stated above, calibrator 100 may be deployed by the same ship (or other RFD-equipped vehicle) that will subsequently use it for calibration. In that case, the approaching step will be performed by deploying the calibrator 100, and then moving to an appropriate distance from calibrator 100.

Step 72 is initiating a calibration process. This step is performed via data communicated from ship 13 to the calibration hardware of calibrator 100. Ship 13 may remotely control configuration parameters, such as signal generator frequency, power level, and dwell time.

In Step 73, the calibration process sends a start time to calibrator 100. The start time represents a start time for a frequency set, which ship 13 will receive at a first azimuthal position on its circle. Calibrator 100 is time-synchronized with RDF system 13a via GPS timestamps. At the designated start time, calibrator 100 begins calibration signal transmissions.

Step 74 is performing the calibration signal collection. The calibration hardware system 20 transmits a set of RF signals to the RDF system 13a of ship 13, at a first position of the ship on its circle. Each set of RF signals comprises a number of radio transmissions of different frequencies. The frequencies in each set are sufficiently different from those of other sets, so that an adequate characterization of the ship's RFD system can be made over its full operational frequency range.

At each azimuth and at each frequency, the ship's calibration process records amplitude and phase responses. Each frequency has an assigned signal duration dwell time. Because the ship's calibration process knows the start time and dwell time, and because the calibrator is time-synchronized with the ship's calibration process, the calibration process collects signal data on the correct frequency at the correct time.

In addition, at each azimuth position of ship 13, ship 13 receives the current GPS location of calibrator 100, via the datalink. During calibration, ship 13 only knows the ship's heading relative to magnetic North and the ship's location Latitude and Longitude (GPS coordinates). Using the location of calibrator 100, the calibration process can calculate the actual relative azimuth of calibrator 100 relative to the ship's bow.

Thus, Step 75 is using the geolocation data from calibrator 100 to assign the correct azimuth to the calibration data points being collected.

In Step 76, the ship 13 moves to a next position on its circle, and repeats the calibration signal and geolocation data collection.

The above steps continue until the ship's calibration process has received calibration signals and geolocation data at all azimuths (360 degrees) around the ship.

In Step 77, the ship's calibration process transmits a stop time to calibrator 100. As indicated above, the use of GPS timestamp data allows calibrator 100 to be synchronized with the ship's calibration process.

Steps 72-77 are then repeated for all frequency lists called for by the calibration process.

Step 78 occurs when the calibration data collection is complete. The recorded antenna responses of the frequencies collected are compiled into an RDF calibration manifold for that specific RDF system. This compiled DF calibration manifold is loaded onto the LOB calculating process of RDF system 13a, and becomes the basis for calculating all subsequent lines of bearing (LOBs) indicating the direction of arrival of intercepted radio signals of interest (SOIs).

What is claimed is:

1. A method of calibrating a radio direction finding (RDF) system carried by a vehicle, the vehicle programmed and/or having a human operator for performing an RDF calibration process, comprising:
   moving within radio communication distance of a mobile calibrator, the mobile calibrator comprising a platform for carrying calibrator hardware, the calibrator hardware comprising at least a controller, a signal generator, a datalink, a global navigation satellite system (GNSS) receiver, and associated antennas;
   wherein the data link comprises data communications hardware separate from the signal generator, the datalink configured to transmit location data of the mobile calibrator to the vehicle and to receive control data from the vehicle that controls calibration frequency signal transmissions provided by the mobile calibrator, and the signal generator configured to communicate calibration frequency signals;
   wherein the mobile calibrator is autonomous, being controlled by the control data via the datalink;
   delivering a request to initiate the calibration process to the calibrator via the datalink;
   moving the vehicle to a first position on a circle;
   receiving calibration signals via the signal generator and geolocation data via the datalink from the calibrator;
   collecting calibration response data in response to the calibration signals;
   determining a relative bearing between the calibrator and the vehicle;
   using the geolocation data and the relative bearing to calculate an actual azimuth between the calibrator and the vehicle and to associate the calibration response data with the actual azimuth;
   repeating the moving, determining, receiving, collecting and using steps as the vehicle travels in the circle; and
   compiling a calibration database representing response data for each actual azimuth.

2. The method of claim 1, wherein the GNSS receiver is a GPS (global positioning satellite) receiver.

3. The method of claim 1, further comprising sending a start time, and wherein the calibration hardware is programmed to synchronize the delivery of calibration signals to the start time.

4. The method of claim 2, wherein the calibration hardware uses GPS timestamp data.

5. The method of claim 1, wherein the vehicle is a ship and the mobile platform is a buoy.

6. The method of claim 1, wherein the vehicle is a ground, air, or water vehicle.

7. The method of claim 1, wherein the moving step is preceded by the step of deploying the calibrator from the vehicle.

8. The method of claim 1, wherein the mobile platform is an unmanned aerial, ground or water vehicle.

9. The method of claim 1, further comprising the step of delivering calibration dwell times the calibrator.

10. A calibration system for calibrating a radio direction finding (RDF) system carried by a vehicle, comprising:
    a mobile calibrator comprising a platform for carrying calibrator hardware, the calibrator hardware comprising at least a controller, a signal generator, a datalink, a global navigation satellite system (GNSS) receiver, and associated antennas;
    wherein the data link comprises data communications hardware separate from the signal generator, the datalink configured to transmit location data of the mobile calibrator to the vehicle and to receive control data from the vehicle that controls calibration frequency signal transmissions provided by the mobile calibrator, and the signal generator configured to communicate calibration frequency signals;
    wherein the mobile calibrator is autonomous, being controlled by the control data via the datalink;
    a calibration process on-board the vehicle comprising at least a controller, a signal generator, a datalink, a global navigation satellite system (GNSS) receiver, and associated antennas;
    wherein the calibration process receives location data from the mobile calibrator via the datalink, the location data representing the location of the mobile calibrator and delivers control signals to the mobile calibration via the same datalink;
    that performs the following tasks, as the distance between the mobile calibrator and the vehicle changes, to calculate the vehicle's incremental azimuth positions relative to the mobile calibrator as the vehicle moves in a circle relative to the transmitting calibrator by: receiving data representing the vehicle's heading relative to magnetic north and the vehicle's location and using this data and the location data to calculate the incremental azimuth positions of the vehicle relative to the transmitting calibrator.

11. The calibrator of claim 10, wherein the GNSS receiver is a GPS (global positioning satellite) receiver.

12. The calibrator of claim 10, wherein the vehicle is a ship and the transmitting calibrator is on a buoy.

13. The calibrator of claim 10, wherein the transmitting calibrator is on an unmanned aerial, ground or water vehicle.

14. The calibrator of claim 10, wherein the control unit is further programmed to receive dwell times from the vehicle via the datalink, and to control the signal generator in accordance with the dwell times.

* * * * *